Patented Jan. 4, 1938

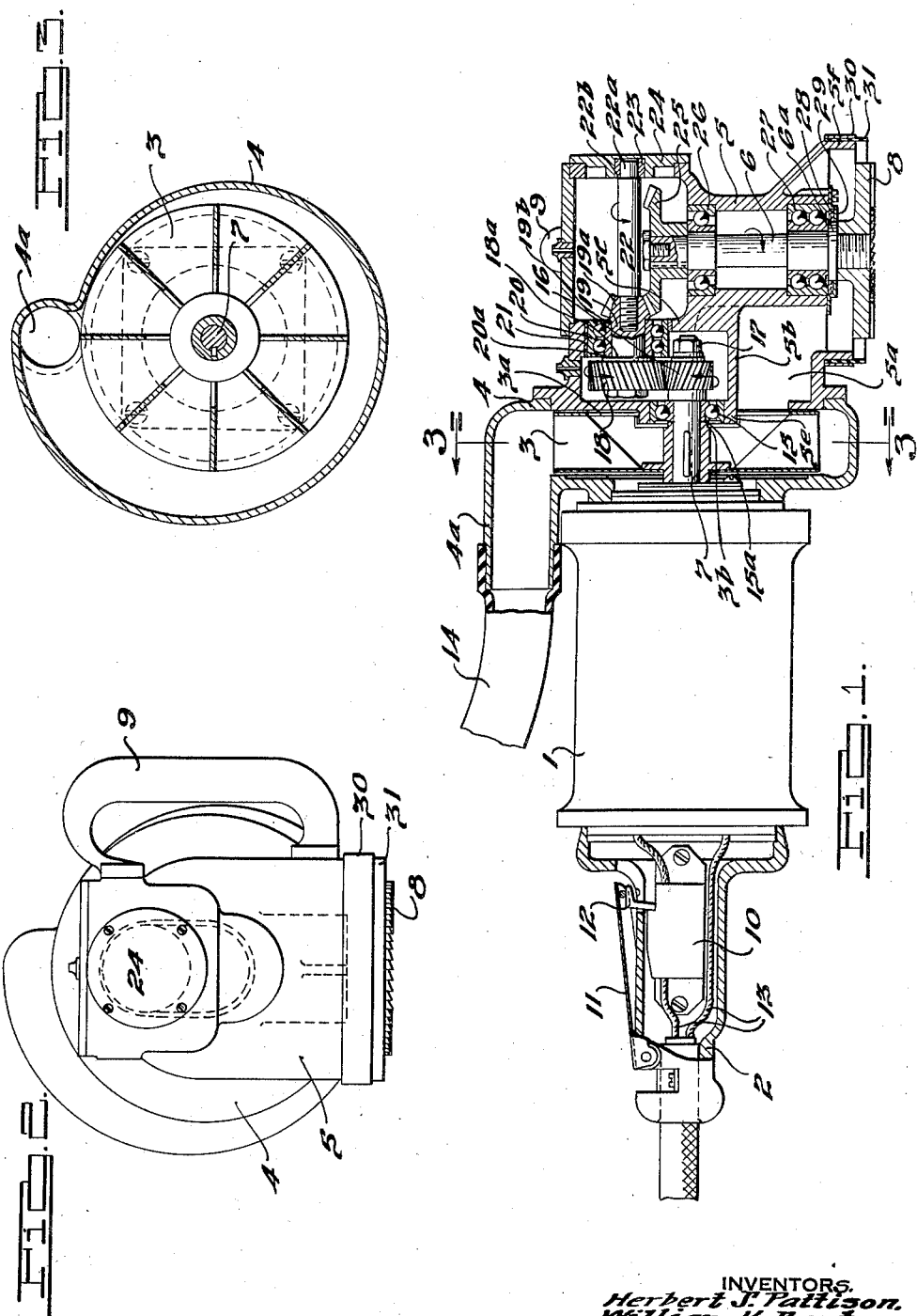

2,104,436

UNITED STATES PATENT OFFICE 2,104,436

PORTABLE GRINDING OR FILING MACHINE

Herbert John Pattison, Detroit, and William K. Barton, Grosse Pointe Park, Mich., assignors to Briggs Manufacturing Company, Detroit, Mich., a corporation of Michigan Application February 10, 1936, Serial No. 63,046

3 Claims. (Cl. 51—170)

This invention relates to portable grinding, filing or abrading machines and has for an object the provision of a light, handy machine for filing or grinding down and smoothening the surfaces of articles, particularly metallic bodies having curved surfaces such as automobile body panels and fenders.

Another object of this invention is to provide a portable filing or abrading machine which has incorporated into it means for automatically collecting the filings which are removed from the work and conveying them to a dust bag or separator.

Another object of this invention is to provide a portable disc grinding, filing or sanding machine in which the reduction in speed between the motor shaft and the tool shaft at right angles to each other is accomplished by gearing mounted in part on an intermediate shaft and arranged so that the end thrusts of the gears on that shaft partly balance each other.

Other objects of this invention will appear in the following description and appended claims, reference being had to the accompanying drawing forming a part of this specification wherein like reference characters designate corresponding parts in the several views.

Fig. 1 is a side elevation of an embodiment of the invention with parts broken away on the vertical median plane to show a portion of the interior construction.

Fig. 2 is an end elevation.

Fig. 3 is a section on the line 3—3 of Fig. 1 looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The present preferred embodiment of this invention, as shown in the drawing, comprises generally a motor 1, a handle 2 on one end of the motor, a fan 3, a fan housing 4, a gear housing 5, a tool carrying shaft 6 supported in the gear housing at right angles to the motor shaft 7, gearing connecting the two shafts, a circular file, grindstone or abrasive disc holder 8 on the tool shaft 6, and a handle 9 on the side of the gear housing.

The motor 1 is a standard motor, such as is used in electric drills, portable sanders, portable grinders, portable polishers or the like, provided with a special shaft to carry the fan 3 and part of the gearing. The handle 2 which is secured to one end of the motor and extends out therefrom approximately coaxially with the motor shaft 7 contains a switch 10 by means of which the motor is started and stopped. The switch is operated by a lever 11 pivoted at one end to the handle 2 and having its other end bearing upon a plunger 12 which projects from the switch. When the lever 11 is pressed down by the hand of a person grasping the handle, the plunger 12 is pushed into the switch, operating the mechanism within the switch to close the circuit through the wires 13 and cause the motor 1 to operate. When the handle 2 is released a spring within the switch 10 presses up the plunger 12, breaking the current and raising up the switch lever 11.

The fan housing 4 is bolted onto the end of the motor 1 opposite from the handle and comprises an involute housing terminating in a discharge pipe 4a which extends back over the top of the motor parallel to the motor shaft 7. The end of the pipe 4a is adapted to receive a hose 14 leading to a dust separator or to receive a dust bag similar to those used on vacuum cleaners. The fan housing contains the centrifugal fan 3 which is keyed directly to the motor shaft 7 so that it will rotate at motor speed, the annular inlet of the fan being situated within a large circular opening in the face of the fan housing 4.

The gear housing 5 which is bolted against the face of the fan housing has an air passage 5a terminating in a substantially circular opening registering with the eye of the fan. A hollow boss 5b depends from the top to the central portion of the opening and receives the forward end of the motor shaft 7 which is supported at the point where it enters the boss by a ball bearing 15. The end of the shaft within the boss carries a helical pinion 16 keyed thereto. The pinion, the core 3a of the fan, the inner race 15a of the bearing, the inner race of the bearing in the motor (not shown) and the motor cooling fan (not shown) are prevented from moving axially by a nut 17 on the end of the motor shaft, which nut presses them up against each other and against a shoulder on the shaft within the motor. The pinion 16 meshes with a gear 18 bolted onto the end of a short intermediate shaft 19 and keyed thereto. This shaft is above and parallel to the motor shaft 7 and is supported by a ball bearing 20 mounted in a sleeve 21 in a web 5c in the gear housing 5. The end of the shaft 19 opposite the gear 18 is formed into a beveled pinion 19a whose larger end forms a shoulder 19b bearing against one end of the inner race 20a or gear shaft bearing, the other end of the inner race butting against a shoulder 18a on the face of the gear 18.

The gear shaft 19 is provided with an extension 22 screwed into the end of the shaft 19 and extending across the gear housing, the other end 22a of the extension being supported by a bearing bushing 23 mounted in the bearing bushing carrier 24 which closes an aperture in the gear housing. The bevel pinion 19a drives a bevel gear 25 keyed and bolted onto the upper end of the vertical tool carrying shaft 6 carried by two ball bearings 26 and 27 mounted in the gear housing 5. The lower end of the shaft 6 carries the tool which in the machine illustrated is a file 8, but which may be a sanding disc, disc grindstone or other tool.

The ball bearings 15 and 27 where the motor shaft enters the gear housing and where the tool carrying shaft leaves the gearing housing are of the type known commercially as "Greaseal" and comprise an annular plate secured to one of the races and cooperating packing means which form an effective grease retainer on the outer side of the bearing. These seal the gear housing against leakage so that the entire housing can be packed with the proper grade of soft grease. In addition, the place where the motor shaft enters the gear housing is protected by a cup-shaped dust shield which fits over the projecting end 5e of the boss 5b and whose inner edge bears lightly against a shoulder 3b on the hub of the fan 3. Any dust which might otherwise enter into the bearing 15 is kept from going in under the edge of the dust shield by centrifugal force. The place where the tool carrying shaft 6 projects from the gear housing 5 is additionally sealed by means of a felt washer 28 and a retaining ring 29, which holds the washer against the edge of a flange 6a on the shaft 6.

The pressure between the bevel pinion 19a and the bevel gear 25 acts at an angle and, therefore, tends to move the shaft carrying the bevel pinion endwards. This end thrust is counterbalanced by making the pinion 16 and the gear 18 helical gears so that the pinion 16 imparts an end thrust to the gear 18 which is greater than the end thrust imparted to the bevel pinion 19a. The thrust on the bevel pinion 19a is, therefore, slightly overbalanced and the whole assembly comprising the gear 18, gear shaft 19, bevel pinion 19a and extension 22 tends to move in the direction of the bushing 23. Such movement is prevented and the assembly positively positioned by a shoulder 22b on the extension which bears lightly against the face of the bushing 23.

The lower end of the gear housing 5 is provided with an annular depending portion or skirt 5f which surrounds the file or other tool 8 but whose lower edge is spaced upwardly from the plane of the working face of the file. Secured to this annular flange by means of a contractible strap 30 is a depending rubber skirt 31 whose lower edge is close to the plane of the working face of the tool. When the tool is in use the fan 3 sucks air in through the passage 5a and the narrow circular slot between the lower edge of the skirt and the surface which is being worked upon in a substantially annular or ring-like sheath and blows it out through the pipe 4a into the dust hose or bag, whichever may be used. The stream of air entering in under the skirt 31 picks up the particles of steel or other material removed by the file and thrown out by centrifugal force and carries them up into the dust disposal means. The provision of the skirt makes the air intake slot around the tool narrower than it would otherwise be and considerably increases the velocity and the carrying power of the air.

We claim:

1. In a portable power tool, a motor, a helical pinion on the motor shaft, an intermediate shaft, a helical gear on the intermediate shaft meshing with the helical pinion, a bevel pinion on the intermediate shaft, a tool driving shaft, and a bevel gear on the tool driving shaft meshing with the bevel pinion, the direction of rotation of the motor and the angle of the helical gears being arranged so that the end thrust of the helical pinion on the helical gear is greater than the thrust of the bevel pinion on the bevel gear and tends to hold said bevel pinion in engagement with said bevel gear.

2. In a portable power tool of the disc type, a gear housing having an annular depending portion, a motor having a shaft, a tool carrying shaft having its lower end projecting below said depending portion, the axes of the motor shaft and the tool carrying shaft intersecting and being perpendicular to each other, a disc tool on the end of the tool shaft and concentric with the said annular depending portion, a fan on the motor shaft for creating a suction of air around the entire periphery of said disc tool, an air passage leading from the tool to the fan, and reduction gearing connecting the motor shaft to the tool shaft and located partly at one side of the air passage.

3. In a portable power tool of the disk type, a gear housing having an annular depending portion, a motor having a shaft, a tool carrying shaft having its lower end projecting below said depending portion, the axes of the motor shaft and the tool carrying shaft intersecting and being perpendicular to each other, a disk tool on the end of the tool shaft and concentric with the said annular depending portion, a fan on the motor shaft for creating a suction of air around the entire periphery of said disk tool, an air passage leading from the tool to the fan, reduction gearing connecting the motor shaft to the tool shaft and located partly at one side of the air passage, and a circular rubber skirt carried by said annular depending portion.

HERBERT JOHN PATTISON.
WILLIAM K. BARTON.